US012636844B2

(12) United States Patent
Balini et al.

(10) Patent No.: US 12,636,844 B2
(45) Date of Patent: May 26, 2026

(54) MOULD AND PROCESS FOR VULCANISING TYRES FOR VEHICLES WHEELS

(71) Applicant: Pirelli Tyre S.p.A., Milan (IT)

(72) Inventors: Alfredo Balini, Milan (IT); Mauro Bigogno, Milan (IT); Angelo Mazzucato, Milan (IT); Claudia Palumbo, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 987 days.

(21) Appl. No.: 17/596,228

(22) PCT Filed: May 28, 2020

(86) PCT No.: PCT/IB2020/055056
§ 371 (c)(1),
(2) Date: Dec. 6, 2021

(87) PCT Pub. No.: WO2020/250070
PCT Pub. Date: Dec. 17, 2020

(65) Prior Publication Data
US 2022/0297398 A1      Sep. 22, 2022

(30) Foreign Application Priority Data

Jun. 13, 2019    (IT) ........................ 102019000008862

(51) Int. Cl.
*B29D 30/06*          (2006.01)
*B29C 33/30*          (2006.01)
*B29D 30/72*          (2006.01)
(52) U.S. Cl.
CPC ..... *B29D 30/0606* (2013.01); *B29D 30/0662* (2013.01); *B29D 30/72* (2013.01); *B29C 33/306* (2013.01)

(58) Field of Classification Search
None
See application file for complete search history.

(56) References Cited

U.S. PATENT DOCUMENTS

| | | | |
|---|---|---|---|
| 4,547,139 A | 10/1985 | Hershberger | |
| 4,684,101 A | 8/1987 | Wagner et al. | |
| (Continued) | | | |

FOREIGN PATENT DOCUMENTS

| | | |
|---|---|---|
| CN | 102085777 A | 6/2011 |
| CN | 102785314 A | 11/2012 |
| (Continued) | | |

OTHER PUBLICATIONS

International Search Report form the European Patent Office in corresponding International Application No. PCT/IB2020/055056 mailed Sep. 9, 2020.

(Continued)

*Primary Examiner* — Sedef E Paquette
*Assistant Examiner* — Alexander D Booth
(74) *Attorney, Agent, or Firm* — Finnegan, Henderson, Farabow, Garrett & Dunner, L.L.P.

(57) ABSTRACT

A mould for vulcanising tyres for vehicle wheels, comprising
  at least one sidewall plate on which a moulding surface is defined,
  a removable insert arranged to be received in a seat which is made in the sidewall plate and open on the moulding surface, the insert comprising a main body on which a base surface is defined which is intended for contacting a portion of a sidewall of the green tyre, and
  a retaining member for retaining the insert inside the seat, wherein the retaining member comprises at least one locking element can be moved in an operating direction between a locking position and a release position.

11 Claims, 2 Drawing Sheets

(56)                  References Cited

U.S. PATENT DOCUMENTS

Figure 1:
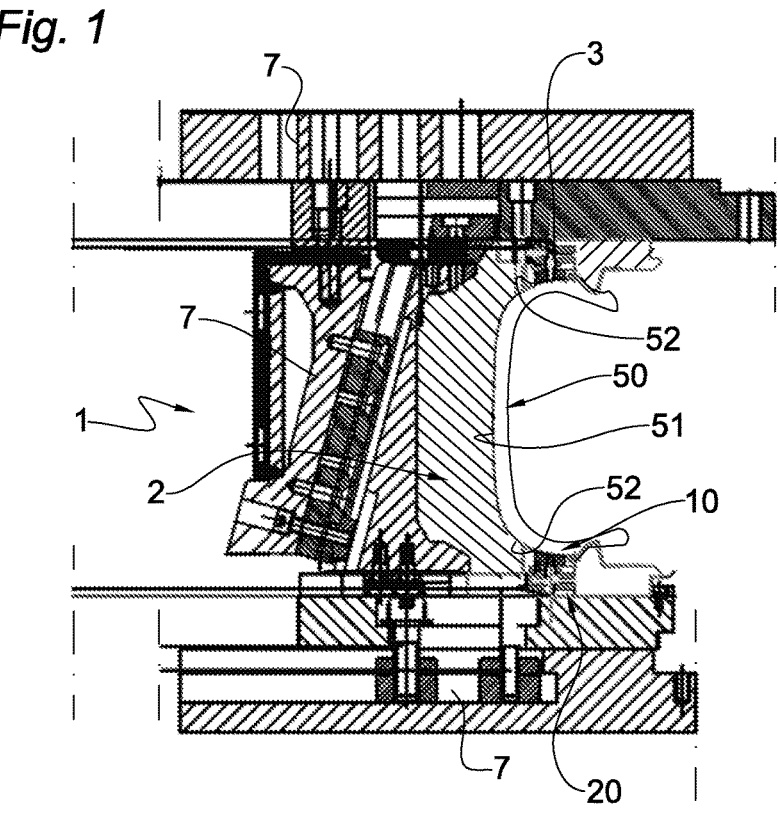

| | | | |
|---|---|---|---|
| 5,690,970 | A | 11/1997 | Irie |
| 6,315,539 | B1 | 11/2001 | Yutronkie et al. |
| 2005/0013891 | A1 | 1/2005 | Hall |
| 2016/0167328 | A1* | 6/2016 | Villeneuve ........... B60C 13/001 |
| | | | 425/28.1 |
| 2018/0194094 | A1 | 7/2018 | Gerhardt |
| 2019/0143620 | A1 | 5/2019 | Pierre et al. |

FOREIGN PATENT DOCUMENTS

| | | |
|---|---|---|
| CN | 105690263 A | 6/2016 |
| CN | 105980140 A | 9/2016 |
| CN | 106466904 A | 3/2017 |
| DE | 19701025 A1 | 7/1998 |
| EP | 0303834 A1 | 2/1989 |
| EP | 0 745 475 A1 | 12/1996 |
| EP | 3 482 920 A2 | 5/2019 |
| FR | 2552366 A1 | 3/1985 |
| JP | 5134573 A | 3/1976 |
| JP | S5134573 U * | 3/1976 |
| JP | 2008-230084 A | 10/2008 |
| KR | 920014583 A | 8/1992 |
| KR | 940021217 A | 10/1994 |
| KR | 2003-0087820 A | 11/2003 |
| WO | WO 00/21727 A1 | 4/2000 |
| WO | 2006121439 A1 | 11/2006 |
| WO | WO 2017/217943 A1 | 12/2017 |

OTHER PUBLICATIONS

Written Opinion of the International Searching Authority from the European Patent Office in corresponding International Application No. PCT/IB2020/055056 mailed Sep. 9, 2020.

Notification of the First Office Action issued by the China National Intellectual Property Administration on May 24, 2023, in corresponding Application No. CN 202080043078.5 (10 pages).

Rejection Decision issued by the China National Intellectual Property Administration on May 17, 2024, in corresponding Application No. CN 202080043078.5 (5 pages).

* cited by examiner

MOULD AND PROCESS FOR VULCANISING TYRES FOR VEHICLES WHEELS

This application is a national stage filing under 35 U.S.C. § 371 of International Application No. PCT/IB2020/055056, filed on May 28, 2020, which claims the benefit of priority to Italian Application No. 102019000008862, filed on Jun. 13, 2019; the disclosure of each of these applications are each incorporated herein by reference in their entirety.

The present invention relates to a mould for vulcanising tyres for vehicle wheels.

A tyre generally has a carcass structure toroidally shaped about an axis of rotation and comprising at least one carcass ply with terminal edges engaged in respective annular anchoring structures, called bead cores.

In a position radially outside the carcass structure, a belt structure is provided, comprising, in the case of car tyres, at least two radially overlapping strips of rubberised fabric with reinforcement cords, and preferably also a third layer of textile or metal cords, arranged circumferentially (at 0 degrees) at least on the ends of the underlying belt strips, in a radially outer position. A tread band, made of elastomeric material, on which a tread surface intended for contact with the road surface is defined, is applied radially outside the belt structure.

In addition, in a position axially outside the carcass structure, there are applied two sidewalls extended from the tread band to the radially inner ends of the tyre, defined by a layer of rubberised ply (beads) surrounding the bead cores.

The process for producing a tyre generally involves a building phase in which the various components of the same tyre are made and assembled, and a subsequent phase of moulding and vulcanisation of the tyre aimed to define the structure of the tyre and in particular its tread band and sidewalls.

To this end, the built but not yet moulded and vulcanised tyre (so-called "green" tyre) is closed inside a vulcanising mould and subjected for an appropriate period of time to temperature conditions so as to determine the desired degree of cross-linking of the elastomeric material.

In addition, during this phase, the green tyre is pressed against the inner surfaces of the vulcanising mould, which are advantageously shaped according to the geometry and configuration to be given to the outer surfaces of the tyre.

In particular, during the moulding phase, the shape and arrangement of grooves, notches and blocks provided into the tread surface, collectively referred to as the "tread pattern", are defined, which contribute to a large extent to determining the behaviour of the tyre on different road surfaces.

In addition, on the inner surfaces of the mould portions in contact with the tyre sidewalls (the "sidewall plates" of the mould), alphanumeric characters and/or illustrations are generally formed, which, thanks to the moulding phase, remain imprinted on the sidewalls so that users may immediately see important information such as the brand, model, logo, size and performance characteristics of the tyre.

In addition, additional information may also be displayed on the sidewalls of the tyre in coded form, for example in the form of barcodes or matrix codes. The latter, more commonly known as 'QR codes', are also increasingly favoured for the greater amount of information they are able to contain for the same surface area occupied. In addition, the range of applications that allow them to be read by commonly used portable electronic devices, such as smartphones, has further encouraged the use of this type of code.

The QR codes are formed by a standard size matrix, typically square, within which two pluralities of basic units having different optical properties, usually small squares of contrasting colour (for example black and white, or more generally light and dark), are appropriately arranged. The different optical properties make it possible to identify the type of basic units using an optical reader, which transforms them into binary code and then decodes the information.

The information shown in coded form on the sidewalls of the tyre may include a few dozen descriptive product parameters, such as size, load index, speed index, seasonality and tyre type. This information may also include details relating to the tyre's production date, typically the working week, which, however, needs to be continuously updated. For this reason, forming these codes directly on the inner surface of the sidewall plate of the mould is very expensive.

In order to solve this problem, the code to be moulded on the sidewall of the tyre may be formed on an insert, which is removably engaged into a seat formed in a sidewall plate of the mould.

The insert is held firmly within the seat by one or more screws which, passing through the sidewall plate, engage in a corresponding threaded hole formed in the insert.

This solution makes it possible to change the code to be moulded on the sidewall of the tyre by replacing the insert, an operation that is clearly less costly than changing the inner surface of the entire sidewall plate.

In the present description and in the accompanying claims, a surface is said to be "substantially continuous" with another surface when any step between one surface and the other is less than 0.3 mm, preferably less than 0.1 mm, and when the width of any gap between one surface and the other is less than 0.05 mm, preferably less than 0.03 mm.

A "shoulder" shall be understood to mean a surface that connects a body portion of smaller cross-section to a body portion of larger cross-section. In particular, the body preferably has a generally cylindrical shape, and the shoulder connects two portions having different diameters.

The shoulder may be inclined with respect to the axis of the cylindrical body by any angle between 10° and 90° and is oriented so as to diverge, i.e. to move away from the axis of the body, passing from the smaller cross-section to the larger cross-section.

The Applicant preliminarily noted that, in order to provide the correct retention action, the screw (or the screws) is (are) extended along the insertion direction of the insert into the seat, which, in general terms, is perpendicular or almost perpendicular to the moulding surface of the sidewall plate of the mould. In addition, to preserve the integrity of the base surface of the insert that is moulded on the sidewall of the tyre, the screw engages the insert from the side opposite to the base surface.

However, the Applicant noted that these characteristics cause serious inconvenience when it comes to replacing the insert.

In fact, from the opposite side of the base surface and therefore of the sidewall plate moulding surface, the mould comprises a heating device, positioned in contact with the sidewall plate to heat it to the correct temperature during the vulcanisation and moulding phase.

Therefore, in order to access the screw (or the screws) that retains (retain) the insert and to thus be able to replace the insert, it is necessary to dismantle the entire sidewall plate and the heating device structure.

The Applicant therefore felt the need to modify the mould in order to make insert replacement operations easier and faster.

Lastly, the Applicant has found that by providing a locking element which can be moved along an operating direction, which is incident with respect to the insertion direction of the insert into the seat, and which contacts the insert or sidewall plate in an appropriate manner, it is possible to obtain an effective and firm retaining action of the insert in the seat and at the same time allow the extraction of the insert from the seat quickly and easily.

In particular, in a first aspect, the invention relates to a mould for vulcanising tyres for vehicle wheels.

Preferably, said mould comprises at least one sidewall plate on which a moulding surface is defined which is intended for contacting an axially external surface of a sidewall of a green tyre.

Preferably, said mould comprises a removable insert arranged to be received in a seat which is made in said sidewall plate and open on said moulding surface.

Preferably, said insert comprises a main body on which a base surface is defined which is intended for contacting a portion of said external surface of said sidewall of the green tyre.

Preferably, said mould comprises a retaining member for retaining said insert inside said seat, comprising at least one locking element.

Preferably, said at least one locking element is mounted on one out of said insert and said sidewall plate.

Preferably, said at least one locking element comprises a first contact surface for contacting the other out of said insert and said sidewall plate.

Preferably, said at least one locking element can be moved in an operating direction, which is incident with respect to an insertion direction of said insert into said seat, between a locking position, in which said insert is retained inside said seat, and a release position, in which said insert is free to leave said seat.

Thanks to these features, the removable insert is retained securely inside the seat or is easily removable from the seat by simply moving the locking element along the operating direction.

This advantageously makes it possible to replace the insert from the sidewall plate of the mould quickly and easily without having to dismantle other mould components.

In a second aspect, the present invention relates to a process for producing a tyre for vehicle wheels, comprising building a green tyre, and moulding and vulcanising said green tyre in a mould formed according to the first aspect.

The present invention, in at least one of the above aspects, may have at least one of the following additional preferred characteristics.

Preferably, in said locking position, said insert is retained inside said seat by said first contact surface such that said base surface is substantially continuous with said moulding surface.

Preferably, said retaining element comprises a resilient element arranged for urging said locking element towards said locking position.

In this way, a snap-locking mechanism can be obtained, which is substantially automatic, very fast and easy to implement. In addition, the force exerted by the locking element on the rod is predetermined by the spring load and therefore independent of the operator's action.

Preferably, said resilient element is received inside a channel which extends in said operating direction and is open in said seat.

In a first embodiment, said locking element is fixed to said sidewall plate and, in said locking position, projects into said seat so as to engage said insert.

In this way, the construction of the inserts is not made more expensive; otherwise, since the inserts are to be replaced very frequently, there would be a significant impact on production costs.

Preferably, said insert comprises a rod which extends in said insertion direction, on the opposite side to said base surface, and said first contact surface engages said insert at said rod in order to retain said insert in said seat.

Preferably, said retaining member comprises a plurality of said locking elements arranged equiangularly around said seat.

In this way, the insert can be retained in the seat with greater force and, in addition, without exerting stresses on it transverse to the insertion direction, which may advantageously cancel each other out.

In one embodiment, said locking element comprises a sphere on which said first contact surface is defined.

Preferably, said sphere is fixed to a free end of the resilient element that is received inside the channel extending along the operating direction and protrudes into the seat.

In a preferred embodiment, a first shoulder is defined on said rod, which shoulder is positioned so as to contact said first contact surface when said locking element is in the locking position.

Preferably, said first shoulder is oriented so as to diverge from said main body.

Preferably, said first shoulder is inclined with respect to a longitudinal axis of said rod by an angle of between 10° and 70°, said angle more preferably being between 20° and 40°.

In this way, when the locking element is in the locking position and contacts the first shoulder, part of the force with which it is urged against the rod is transformed into a component parallel to the insertion direction of the rod into the seat, increasing the retention action of the insert.

In addition, the extraction of the insert from the seat is facilitated. In fact, the movement of the locking element from the locking position to the release position can be achieved simply by pushing the insert in a direction opposite the insertion direction, overcoming the action of the resilient element.

In a preferred embodiment, a second shoulder is defined on said rod, which second shoulder is positioned on the opposite side to said main body with respect to said first shoulder.

Preferably, said second shoulder is oriented so as to diverge towards said main body.

Preferably, said second shoulder is inclined with respect to a longitudinal axis of said rod by an angle of between 10° and 70°, said angle more preferably being between 20° and 40°.

In this way, the extraction of the insert from the seat is facilitated, since during this movement the locking element is urged against the second shoulder so that part of the force with which it is urged against the rod is transformed into a component parallel to the insertion direction and directed outwards from the seat.

Preferably, said first shoulder and said second shoulder, even if oriented in the opposite way, are inclined by an angle substantially equal to a longitudinal axis of said rod.

Preferably, said first shoulder defines a first flank of a circumferential groove formed on said rod.

In this way, the rod can have any angular orientation with respect to the main body, thus simplifying the production phase of the insert.

Preferably, said plurality of locking elements, when in the locking position, engages said rod at said first shoulder.

In this way, it is sufficient for just a single shoulder for all the locking elements to be formed on the rod.

In one embodiment, a passage is formed on said sidewall plate, which passage connects said seat to the outside of said mould so as to allow an operator to insert a manoeuvring tool to contact said insert and remove said insert from said seat. Preferably, said passage extends substantially perpendicularly to said insertion direction.

In this way, the operation of removing the insert from the seat can be carried out by the operator by accessing the seat laterally, avoiding the disassembly of mould components attached to the sidewall plate from the opposite side of the moulding surface, such as the sidewall plate heating device.

Preferably, the passage is open in the seat in a position that is slightly spaced from the free end of the rod when the insert is received in the seat, so that the manoeuvring tool can push the insert out of the seat by simply pressing against the free end.

In one embodiment, said locking element is fixed to said sidewall plate and said first contact surface is arranged to contact said insert and move it in said insertion direction inside said seat further to the movement of said locking element in said operating direction.

In this way, the movement of the insert inside the seat is directly determined by the movement of the locking element along the operating direction.

In one embodiment, said first contact surface is inclined with respect to said operating direction by an angle of less than 45°, more preferably greater than 15°, and even more preferably between 25° and 35°.

In one embodiment, said locking element comprises a second contact surface arranged to contact said insert and move it in said insertion direction towards the outside of said seat further to the movement of said locking element towards said release position.

In this way, it is the same movement of the operating locking element towards the release position that determines the ejection of the insert from the seat, without the need to provide additional passages other than the locking element housing channel.

In one embodiment, said second contact surface is inclined with respect to said operating direction by an angle of less than 45°, more preferably greater than 15°, and even more preferably between 25° and 35°.

Preferably, said first contact surface and said second contact surface are substantially parallel to one another.

Preferably, said first contact surface and said second contact surface delimit a slot which is formed on said locking element and is externally open in order to engage and release said insert when said locking element is moved in said operating direction between said locking position and said release position.

In one embodiment, said locking element comprises a threaded pin which can be engaged by a manoeuvring tool in order to move said locking element in said operating direction inside said channel.

In this way, the locking element can be effectively moved towards the release position by overcoming the possible action of the resilient element.

In this case, preferably, the channel is open, on the side opposite the seat, towards the outside of the mould.

In a further embodiment, the retaining element of the insert inside the seat comprises at least one magnetic element arranged in the sidewall plate or in the insert.

Preferably, the magnetic element is arranged in the sidewall plate, at the bottom of the seat.

In this case, the retention force retaining the insert inside the seat is of the magnetic type and not purely mechanical.

It is provided that the magnetic element is the only retaining element of the insert or that it is provided to supplement one of the retaining elements described above.

In this case, moreover, the insert can be extracted from the seat using another magnetic element, of greater force than the one that retains the insert inside the seat, pulling the insert from the side of the moulding surface. In this way, it is not necessary to provide any access in the sidewall plate in order to push the insert out of the seat.

Preferably, the magnetic element is at least partially surrounded by a paramagnetic or diamagnetic material, so as to increase the magnetic flux towards the insert, and, more preferably, the magnetic element is arranged inside a paramagnetic or diamagnetic material container that is open at a side facing the seat.

In this way, the retention action of the insert by the magnetic element is greater and more effective.

Figure 2:
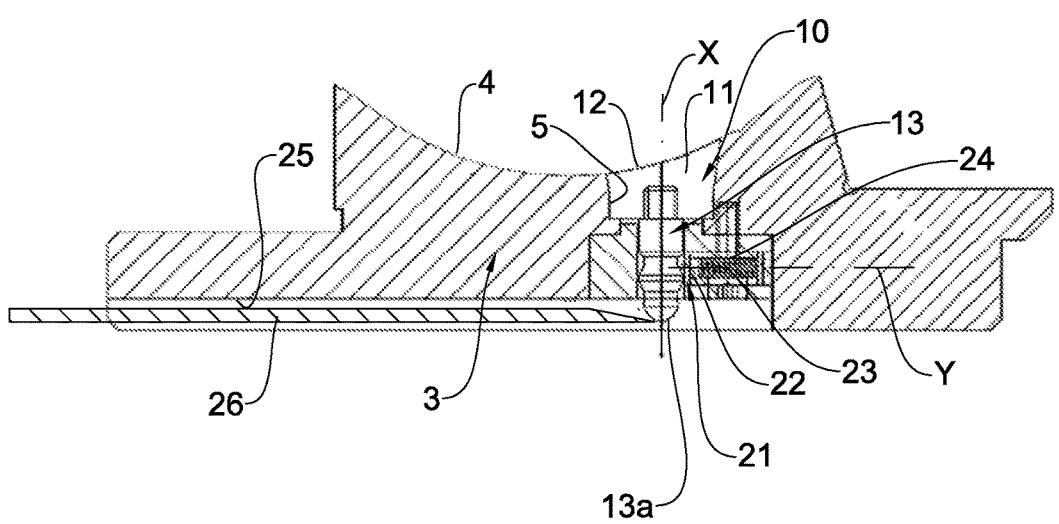
Figure 3:
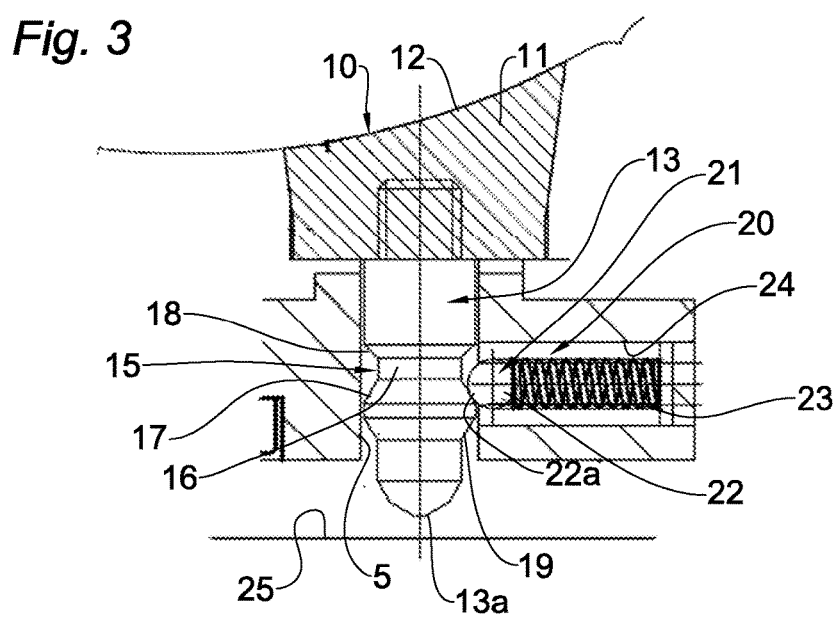
Figure 4:
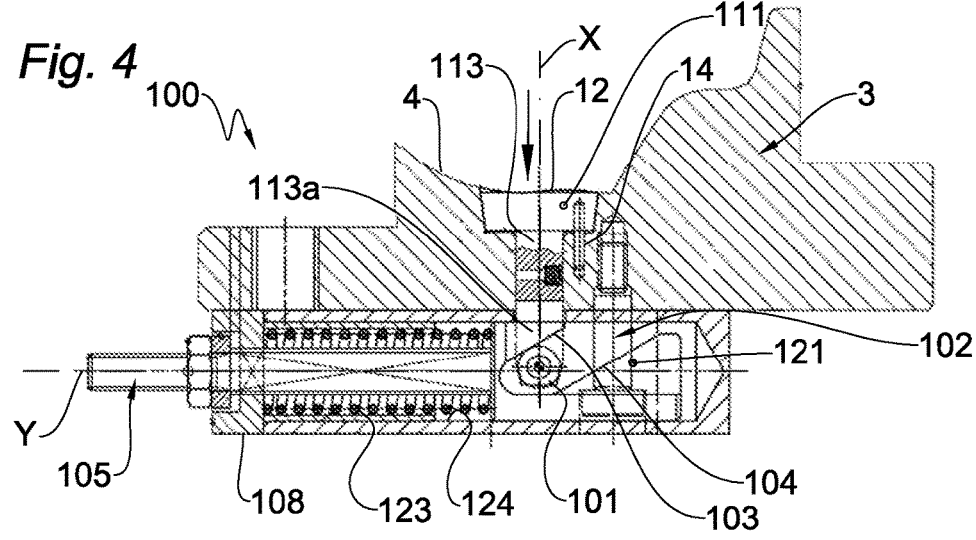
Figure 5:
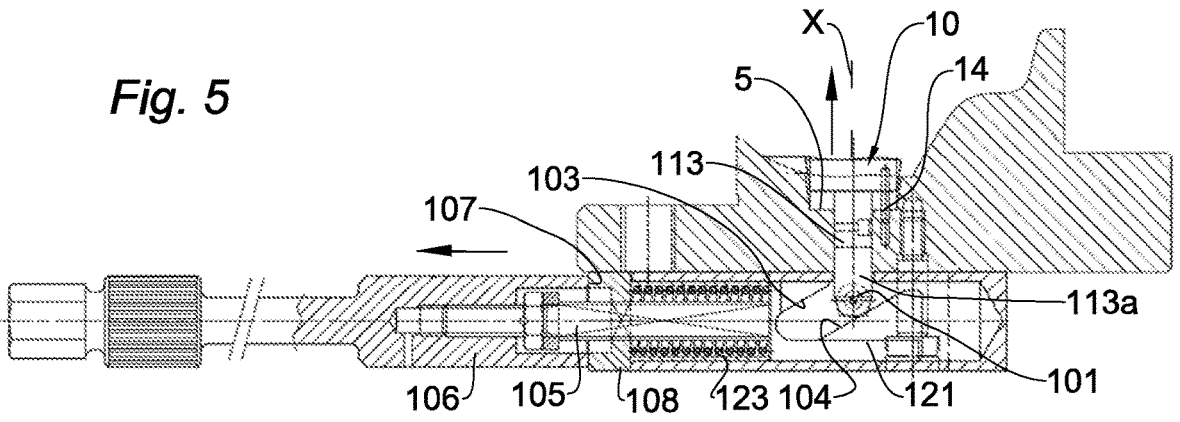

The characteristics and advantages of the invention will become clearer from the detailed description of a number of preferred exemplary embodiments thereof, illustrated by way of indication and in a non-limiting manner with reference to the accompanying drawings, in which:

FIG. 1 is a schematic, partial, cross-sectional view of a mould for vulcanising tyres for vehicle wheels formed according to a first exemplary embodiment of the present invention;

FIG. 2 is a schematic view on an enlarged scale of a component of the mould of FIG. 1, FIG. 3 is a schematic view on a further enlarged scale of a portion of the mould of FIG. 2, FIG. 4 is a schematic cross-sectional view of a portion of a mould for vulcanising tyres for vehicle wheels formed according to a second exemplary embodiment of the present invention, FIG. 5 is a schematic view of the mould portion of FIG. 4 in a different operating configuration.

With initial reference to FIGS. 1 to 3, a first example of a mould for vulcanising tyres for vehicle wheels formed according to the present invention is denoted as a whole by 1.

The mould 1 has a conventional overall general structure and comprises a closed moulding chamber in which a green tyre 50 is received for the moulding and vulcanisation process.

The tyre 50 has a generally toroidal shape developed around a rotational axis and comprises a tyre structure that is conventional per se, on which an elastomeric tread band 51 is arranged in a radially outer position, on which tread band there is defined a tread surface intended for contact with a road surface, as well as a pair of sidewalls 52, extended from the ends of the tread surface towards the rotational axis.

With reference to the radial and axial directions of the tyre 50 when it is received in the mould 1, the moulding chamber is delimited radially by a plurality of heads 2, generally at least 8, which are suitably shaped to form annular sectors and which are substantially intended to contact the tread band 51, and axially by a pair of sidewall plates 3, which are substantially intended to contact the tyre sidewalls 52. Both the heads 2 and sidewall plates 3 may be moved away from each other to allow the mould to be opened and the green tyre to be inserted into the moulding chamber and removed once it has been moulded and vulcanised.

A heating device 7 is associated with the heads 2 and sidewall plates 3 to transmit to the green tyre the heat necessary to reach the temperature intended for vulcanisation.

Inside the moulding chamber of the mould 1, a membrane, which is conventional per se and not shown in the accompanying figures, may be provided and may be expanded to compress the green tyre 50 against the inner walls of the heads 2 and sidewall plates 3 at a predetermined pressure.

On the inner walls of the mould 1 intended to come into contact with the green tyre, corresponding pluralities of raised portions and recesses are suitably formed so as to obtain, by moulding on the radially outer surface of the tread band 51, the configuration of the tread pattern and, on the sidewalls 52, writing and images useful, for example, for providing visible information to the user regarding the characteristics of the tyre 50.

In particular, on at least one sidewall plate 3, and preferably on both sidewall plates 3, a moulding surface 4 is defined and is intended to contact the outer surface of a tyre sidewall 52.

On the moulding surface 4 of the sidewall plate 3 there is also provided, in a suitable position, a seat 5 to accommodate, with the possibility of removal, an insert 10.

The insert 10 comprises a main body 11, on which there is defined a base surface 12, turned towards the outside of the sidewall plate 3 when the insert 10 is received in the seat 5, as well as a rod 13 extended from the main body 11, from the opposite side to the base surface 12.

The rod 13 is preferably fixed to the main body 11 by means of a screw coupling, so that the rod can be recovered and reused when replacing the insert 10.

Preferably, from the main body 11 there also extends, in a position parallel to and spaced-apart from the rod 13, a plug 14 (shown in FIGS. 4 and 5) intended to be received in a corresponding recess formed inside the seat 5.

The shape of the seat 5 matches the shape of the main body 11, the rod 13 and the plug 14, so that the insert 10 can be inserted into the seat 5 with a specific, predefined orientation. In this way, an insertion direction X of the insert 10 into the seat 5, which is substantially parallel to the axis of the rod 13 and the plug 14, is identified.

Preferably, the main body 11 has a profile tapered away from the base surface 12, so as to allow a substantially tight fit with the sidewall plate 3, and so as to prevent, as far as possible, any elastomeric material from entering the seat 5.

On the rod 13, in a generally median position, there is defined a first shoulder 17 oriented so as to diverge away from the main body 11 and inclined with respect to the axis of the rod 13 by an angle of about 30°. In other words, the first shoulder 17 connects a portion of the rod 13 of smaller diameter to a portion of the rod of larger diameter, with the larger diameter portion being further away from the main body 11 than the portion of the rod of smaller diameter.

The first shoulder 17 is defined by a first flank of a circumferential groove 15 formed on the rod 13. The circumferential groove 15 has a generally trapezoidal section, with a bottom 16, connected to the outer surface of the rod 13 by the first shoulder 17 from the side facing a free end 13a of the rod 13 and, from the side facing the main body 11, by a second flank of the groove 18.

The second flank of the groove 18 is inclined with respect to the axis of the rod 13 by an angle of about 45°.

On the rod 13, in a position between the first shoulder 17 and the free end 13a there is also defined a second shoulder 19, which is oriented so as to diverge as it approaches the main body 11 (i.e. is oriented so as to converge towards the free end 13a), and is inclined with respect to the axis of the rod 13 by an angle of about 30°. In other words, the second shoulder 19 connects a portion of the rod 13 of smaller diameter to a portion of the rod of larger diameter, with the portion of larger diameter being closer to the main body 11 than the portion of the rod of smaller diameter.

As mentioned above, the base surface 12 faces the inside of the moulding chamber and is intended for contact with the tyre sidewall 52.

The coupling of the insert 10 in the seat 5 is such that the base surface 12 is substantially continuous with the moulding surface 4 of the sidewall plate 3, without appreciable steps in the transition between the two surfaces.

In addition, the base surface 12 has a curved profile, quite similar to the profile of the moulding surface 4, so as to maintain the continuity of the overall surface trend.

The base surface 12, seen from above, can have any desired shape, for example a generally rectangular shape with rounded corners.

Any desired information or logo, for example an alphanumeric lettering or QR code, can be formed on the base surface 12.

On the sidewall plate 3 there is also provided a retaining element 20 designed to retain the insert 10 in the seat 5 in a removable manner.

In the first exemplary embodiment described herein with particular reference to FIGS. 2 and 3, the retaining element 20 comprises three locking elements 21, mounted on the sidewall plate 3 and designed to contact the rod 13 of the insert 10 at the first shoulder 17.

In particular, each locking element 21 comprises a sphere 22, protruding into the seat 5 and fixed to the free end of a spring 23, which is in turn received and guided in a corresponding channel 24, formed in the sidewall plate 3 and open in the seat 5. In particular, each channel 24 is radially extended from the portion of the seat 5 in which the rod 13 is received, substantially perpendicularly to the insertion direction X, thus defining an operating direction Y in which the locking element 21 can be moved inside the seat 5.

The three locking elements 21 are arranged in a coplanar manner in the same radial plane with respect to the insertion direction X and spaced apart at equal angles of about 120°.

In addition, each channel 24 is formed in such a position that it is substantially aligned in the operating direction Y with the first shoulder 17 when the insert 10 is inserted in the seat 5.

In this way, when the insert 10 is inserted in the seat 5, the sphere 22, under the stress of the spring 23, is moved substantially inside the circumferential groove 15, defining a locking position of the locking element 21.

In this position, the sphere 22 is engaged in the circumferential groove 15 and retains the insert 10 in the seat 5.

In particular, when in the locked position, the outer surface of the sphere 22, which defines a first contact surface 22a, is abutted against the first shoulder 17 in such a way that, due to the inclination of the latter with respect to the insertion direction X and the operating direction Y, part of the force with which the sphere 22 is urged against the rod 13 assumes a direction parallel to the insertion direction X and directed towards the free end 13a of the rod. In this way, the locking element 21, when moved into the locking position, not only prevents the insert 10 from escaping from the seat 5, but actively retains it inside.

In the locking position, the sphere 22 does not abut the bottom 16 of the groove 15, and therefore the full force exerted by the spring 23 is applied to the first shoulder 17, and therefore the component of this force directed towards the free end 13a is as large as possible.

When the three locking elements 21, which are substantially identical to each other and are arranged in a coplanar manner, spaced apart at equal angles, are all moved into the locking position simultaneously abutting the first shoulder 17, the force exerted by them on the rod 13 perpendicular to the insertion direction X is substantially zero, while the force exerted by them on the rod 13 parallel to the insertion direction X is the sum of the individual components, increasing the force by which the insert is retained in the seat 5.

Each locking element 21 can also be moved in the operating direction Y from the locking position to a release position in which the sphere 22 is outside the circumferential groove 15 and the insert 10 can freely exit the seat 5.

To move the locking element 21 into the release position, the force of the spring 22 must be overcome.

For this purpose, in the preferred example described herein, it is provided that on the sidewall plate 3 there is formed a passage 25 which connects the seat 5 to the outside of the mould 1.

The passage 25 extends substantially perpendicular to the insertion direction X and is open in the seat 5 so that it is slightly spaced from the free end 13a of the rod 13, when the insert 10 is received in the seat 5.

In this way it is possible to insert a manoeuvring tool 26 into the passage 25, which manoeuvring tool is able to contact the rod 13 at its free end 13a and push it along the insertion direction and out of the seat 5. To facilitate this operation, the manoeuvring tool 26 preferably has a pointed or slanted end (as shown in FIG. 2).

The action of the manoeuvring tool 26 is sufficient to move the rod 13 outwards from the seat 5 by a sufficient amount so that the sphere 22 exits the circumferential groove 15 and abuts the second shoulder 19. In this position, due to the inclination of the second shoulder 19, part of the force exerted by the spring 22 is transformed into a component directed along the axis of the rod 13 towards the main body 11, so that the insert 10 is pushed out of the seat 5.

FIGS. 4 and 5 show a second exemplary embodiment of a mould for vulcanising and moulding according to the present invention, denoted as a whole by 100, in which components similar to those in the previous example are denoted by the same reference numeral.

The mould 100 differs from the mould 1 in that the insert 10 is retained inside the seat and removed from it in a different way.

The insert 10 comprises a main body 111 similar to the main body 11, and a rod 113 extending from the main body 111 from the opposite side to the base surface 12.

The free end of the rod 113 is shaped like a fork and comprises a pair of tines 113a between which there is pivoted a wheel 101, freely rotating about its axis, perpendicular to the rod 113. The wheel 101 represents a hooking element of the insert 10, which can be engaged by a locking element 121 designed to retain and remove the insert 10 in/from the seat 5, as better explained below.

The locking element 121 can be moved in an operating direction Y defined by the axis of a channel 124 between a locking position, in which the locking element 121 engages and retains the insert 10 in the seat 5, and a release position, in which the locking element 121 is disengaged from the insert 10, which can then be removed from the seat 5.

The locking element 121 is urged towards the locking position by a spring 123 which extends in the channel 124.

The channel 124 is formed in the sidewall plate 3 substantially perpendicularly to the insertion direction X and is open at one end thereof in the seat 5 and at one longitudinally opposite end thereof outside of the mould 100.

Preferably, the channel 124 is open in the seat 5 at the free end of the rod 113 when the insert 10 is engaged in the seat 5.

On the locking element 121 there is formed a slot 102, with a profile open to the outside of the locking element, which is designed to engage the wheel 101 of the rod 113 when the insert 10 is inserted in the seat 5.

In particular, the slot 102 is delimited by a first contact surface 103 and by a second contact surface 104 joined together at the bottom of the slot 102.

The first contact surface 103 and the second contact surface 104 are substantially parallel to each other and are inclined with respect to the operating direction Y by an angle of about 30°.

The locking element 121 also comprises a pin 105 which extends inside the channel 124 from the side opposite to the seat 5, through the spring 123, until it protrudes outside the sidewall plate 3.

The portion of the pin 105 protruding from the channel 104 outside the mould is suitably threaded so that it can be engaged by screwing by a manoeuvring tool 106.

This instrument comprises an internal threaded cavity, open at one axial end 107 of the manoeuvring instrument 106.

As the tool is screwed onto the threaded pin 105, the axial end 107 of the manoeuvring tool 106 contacts a fixed end flange 108 of the channel 124, causing the locking element 121 to move in the operating direction Y towards the release position, in contrast to the action of the spring 123.

During this movement, the wheel 101 of the rod 113 is contacted by the second contact surface 104, which, due to its inclination, pushes the rod 113 along the insertion direction X, out of the seat 5.

On the contrary, by unscrewing the manoeuvring tool 106, the locking element 121 is released and moved into the locking position by the action of the spring 123.

During this displacement, the wheel 101 of the rod 113 is contacted by the first contact surface 103, which is wedged between the tines 113a above the wheel 101 (as shown in FIG. 4), and, due to its inclined shape, pulls the rod 113 in the insertion direction X inside the seat 5.

The invention claimed is:

1. A mould for vulcanising tyres for vehicle wheels, comprising:

at least one sidewall plate on which a moulding surface is defined and contacts an axially external surface of a sidewall of a green tyre, a removable insert arranged to be received in a seat which is made in the sidewall plate and open on the moulding surface, wherein the removable insert comprises a main body on which a base surface is defined and contacts a portion of the axially external surface of the sidewall of the green tyre, and a retaining member for retaining the removable insert inside the seat, wherein the retaining member comprises at least one locking element which is mounted on one out of the removable insert and the sidewall plate and comprises a first contact surface for contacting the other out of the removable insert and the sidewall plate, and wherein the at least one locking element can be moved in an operating direction, which is incident with respect to an insertion direction of the removable insert into the seat, between a locking position, in which the removable insert is retained inside the seat, and a release position, in which the removable insert is free to leave the seat;

wherein the removable insert comprises a rod which extends in the insertion direction, on the opposite side to the base surface, and the first contact surface engages the removable insert at the rod to retain the removable insert in the seat and wherein a first shoulder is defined on the rod, wherein the first shoulder:

diverges away from the main body;

inclines with respect to a longitudinal axis of the rod at an angle between 10° and 70°; and is configured to contact the first contact surface with a force, wherein at least part of the force urges the rod by the first contact surface in a direction parallel to an insertion direction X, towards a free end of the rod, actively forcing the removable insert toward the seat, when the locking element is in the locking position;

wherein, when the locking element is in the locking position, the locking element is not in contact with a bottom of a circumferential groove that is defined at least partly by the first shoulder.

2. The mould according to claim 1, wherein, in the locking position, the removable insert is retained inside the seat by the first contact surface such that the base surface is substantially continuous with the moulding surface.

3. The mould according to claim 1, wherein the retaining member comprises a resilient element for urging the locking element towards the locking position.

4. The mould according to claim 3, wherein the resilient element is received inside a channel which extends in the operating direction and is open in the seat.

5. The mould according to claim 1, wherein the locking element is fixed to the sidewall plate and, in the locking position, projects into the seat to engage the removable insert.

6. The mould according to claim 1, wherein the retaining member comprises a plurality of the locking elements arranged equiangularly around the seat.

7. The mould according to claim 1, wherein the locking element comprises a sphere on which the first contact surface is defined.

8. The mould according to claim 1, wherein a second shoulder is defined on the rod, wherein the second shoulder is:

oriented to diverge towards the main body, inclined with respect to the longitudinal axis of the rod by an angle between 10° and 70°, and positioned on the opposite side to the main body with respect to the first shoulder.

9. The mould according to claim 6, wherein the plurality of locking elements, when in the locking position, engages the rod at the first shoulder.

10. The mould according to claim 1, wherein a passage is formed on the sidewall plate, wherein the passage connects the seat to the outside of the mould to allow an operator to insert a manoeuvring tool to contact the removable insert and remove the removable insert from the seat.

11. The mould according to claim 10, wherein the passage extends perpendicularly to the insertion direction.

\*    \*    \*    \*    \*